United States Patent [19]

Liethen

[11] Patent Number: 5,671,696

[45] Date of Patent: *Sep. 30, 1997

[54] MOLDED BIRD FEEDER ASSEMBLY

[76] Inventor: Frederic J. Liethen, P.O. Box 296, Appleton, Wis. 54912

[*] Notice: The term of this patent shall not extend beyond the expiration date of Pat. No. 5,435,268.

[21] Appl. No.: 505,864

[22] Filed: Jul. 24, 1995

Related U.S. Application Data

[63] Continuation-in-part of Ser. No. 277,214, Jul. 19, 1994, Pat. No. 5,435,268.

[51] Int. Cl.$^6$ .................................................. A01K 5/00
[52] U.S. Cl. ............................................................. 119/57.8
[58] Field of Search ................................. 119/52.2, 52.3, 119/57.8, 57.9

[56] References Cited

U.S. PATENT DOCUMENTS

| | | | |
|---|---|---|---|
| 2,683,440 | 7/1954 | Klix | 119/57.8 |
| 4,223,637 | 9/1980 | Keefe | 119/52.2 |
| 4,242,984 | 1/1981 | Smith | 119/52.2 |
| 4,259,927 | 4/1981 | Clarke . | |
| 4,356,927 | 11/1982 | Blasbalg . | |
| 4,691,665 | 9/1987 | Hefner | 119/57.9 X |
| 4,896,628 | 1/1990 | Kadunce | 119/52.2 |
| 5,215,039 | 6/1993 | Bescherer | 119/52.2 X |
| 5,555,843 | 9/1996 | Harmon | 119/57.8 |

*Primary Examiner*—Robert P. Swiatek
*Attorney, Agent, or Firm*—Andrus, Sceales, Starke & Sawall

[57] ABSTRACT

A tubular plastic bird feeder is made from a unitary blow molded enclosure which includes engageable thread patterns on one end cap and the adjacent end of the tubular body which are separated in molding by an integral annular sleeve. The sleeve is cut away circumferentially at both ends from the as-molded enclosure leaving a separated end cap which may be threaded onto the end of the tubular body. Similar integrally molded thread patterns may be formed on the other end of the unitary enclosure to provide either another removable end cap or the facility to thread another tubular body onto the end of the first tubular body to provide an extended length feeder. One embodiment includes a circular barrier disc supported in the tubular body below the lowermost seed holes to prevent seed, and other particles from accumulating in the inaccessible lower end of the feeder. In lieu of conventional seed holes cut, punched or otherwise formed in the tubular body, the body may be formed in the blow molding process to include angled seed ports with protective deflector hoods. Another embodiment includes internal and external thread patterns on one end of the tubular body to accommodate either of two seed tray constructions.

20 Claims, 6 Drawing Sheets

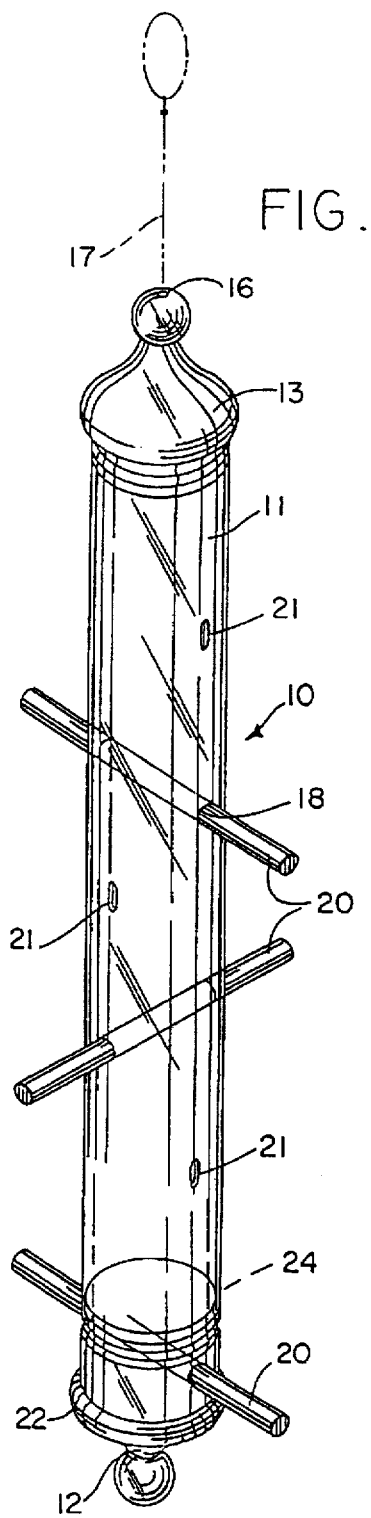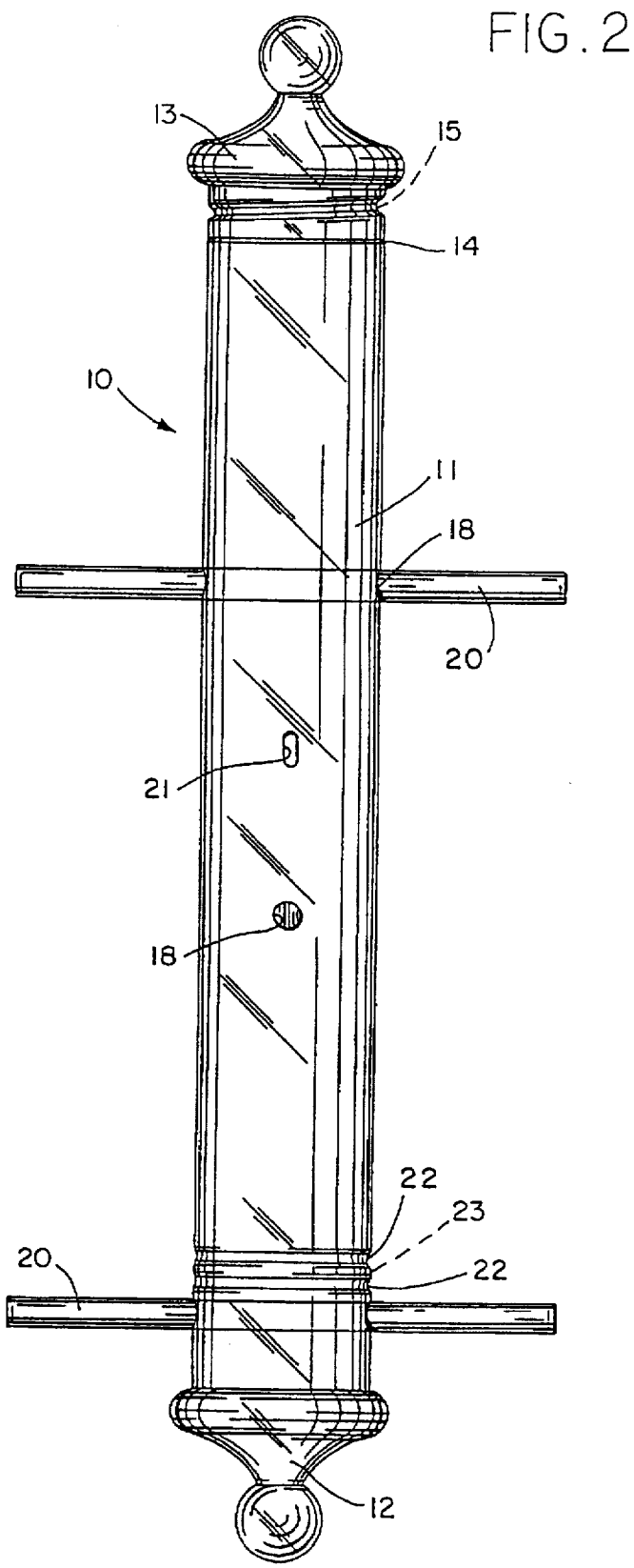

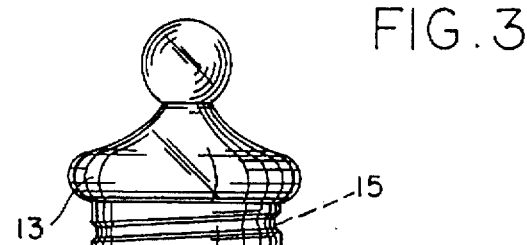
FIG. 3
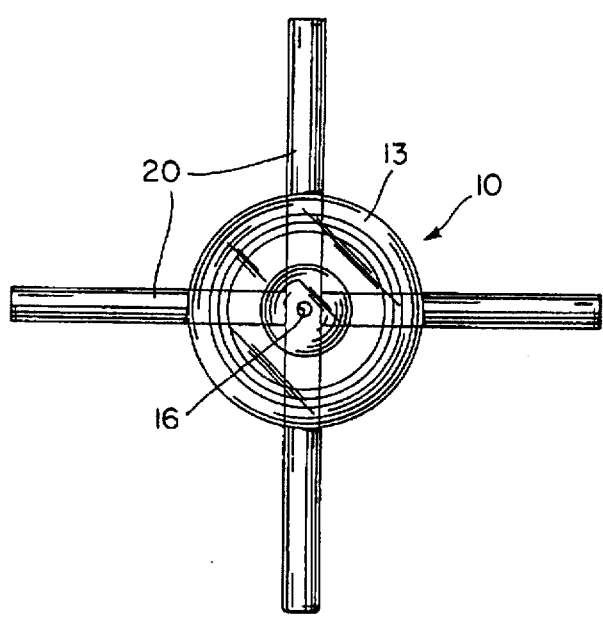
FIG. 4
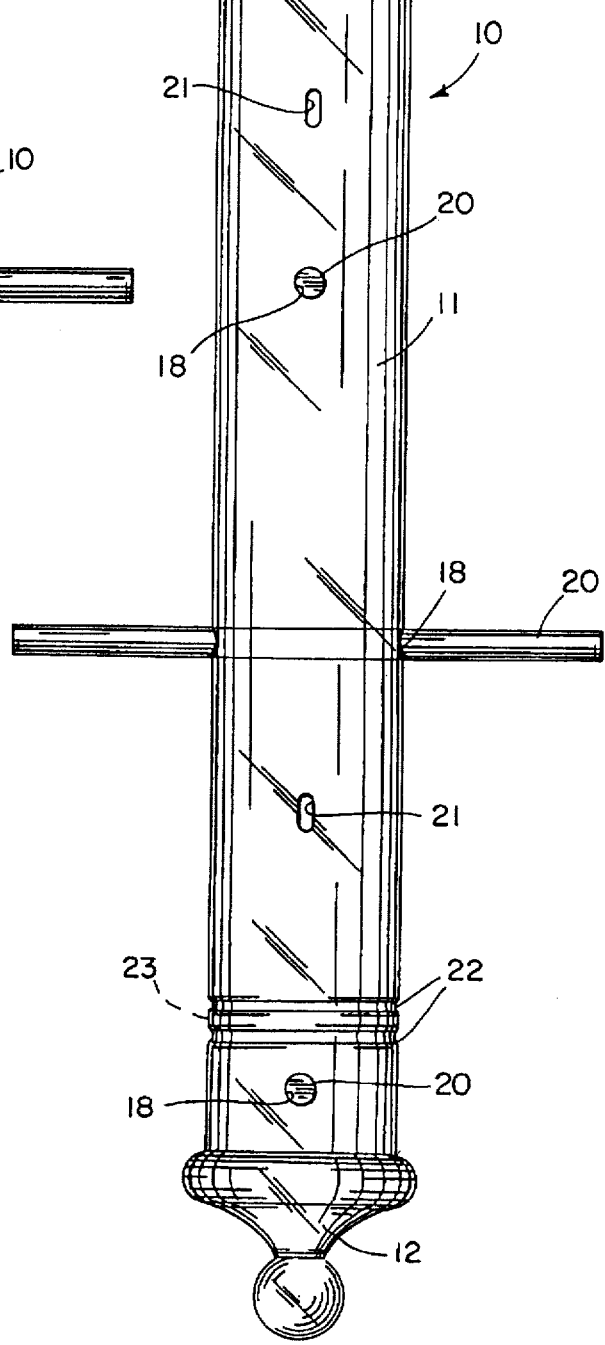
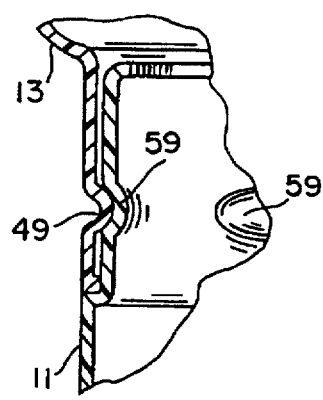
FIG. 21

FIG. 13
FIG. 14
FIG. 15
FIG. 16
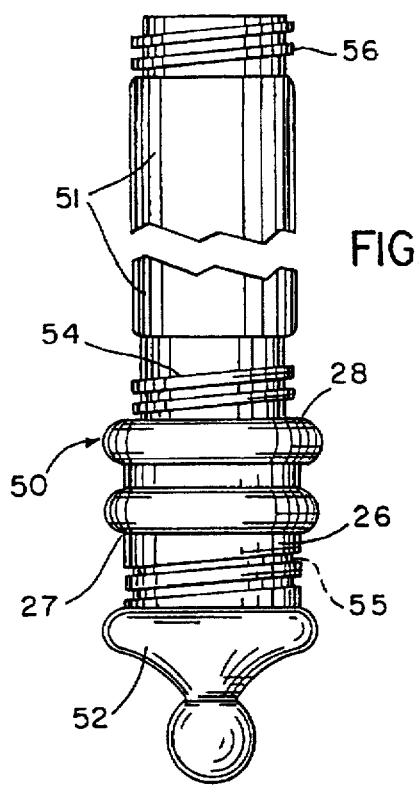
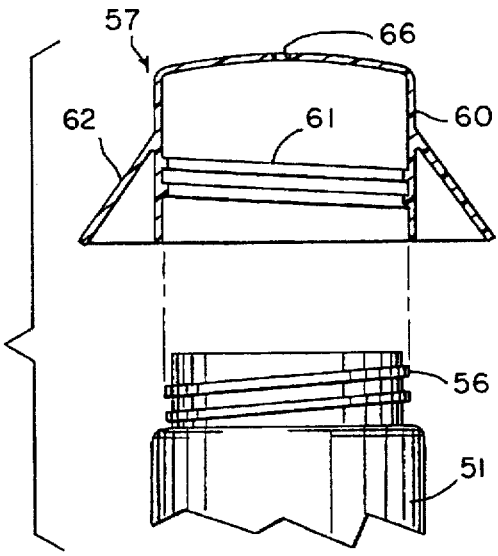
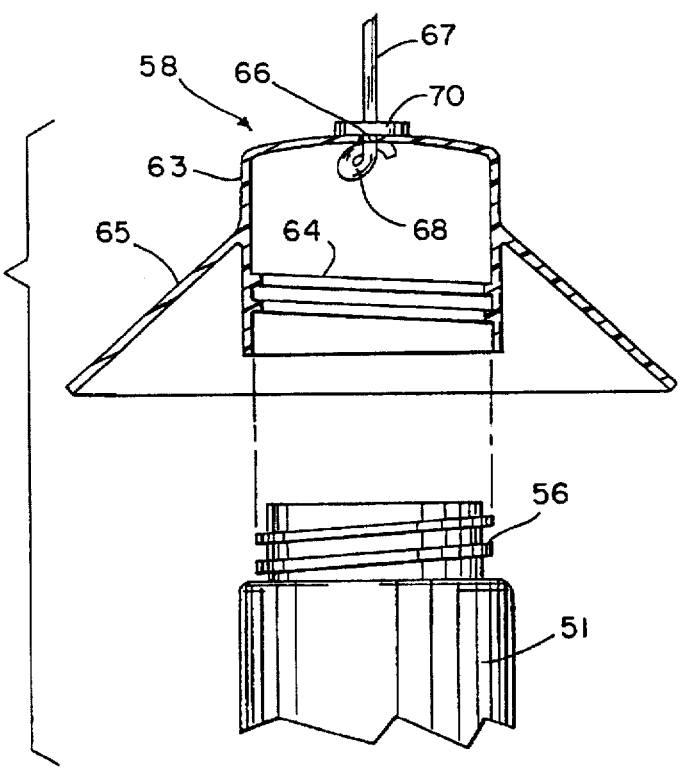
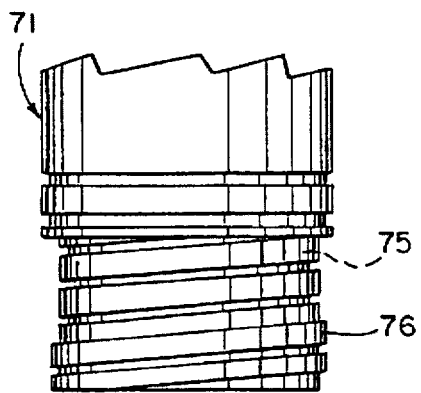

MOLDED BIRD FEEDER ASSEMBLY

This is a continuation-in-part of application Ser. No. 08/277,214, filed Jul. 19, 1994, now U.S. Pat. No. 5,435,268.

BACKGROUND OF THE INVENTION

The present invention pertains to a tubular plastic bird feeder and, more particularly, to such a feeder of blow molded construction.

Bird feeders having long hollow tubular bodies are well known in the art. The bodies are typically made from transparent cylindrical tubing provided with opposite horizontally aligned hole pairs through which bird perches may be inserted. A seed port is typically provided for each end of each perch and a conventional feeder of, for example, fifteen inches to eighteen inches in length may be provided with three or four vertically spaced perches. The opposite ends of the tubular body are closed with plastic or metal end caps and the upper end cap, which is removable for refilling, typically includes a suitable hanger. The hanger may comprise a wire bail or hook, piece of cord, or an integrally formed hanging bracket. Some tubular plastic bird feeders also include separate hooded seed ports which are inserted in large openings in the tube wall to facilitate feeding and prevent loss of seed from the downwardly descending seed column.

Prior art tubular bird feeders therefore require a half dozen or more separate parts in the manufacture of the feeder, a number of which are typically made of metal. Often, the bottom end caps or closures are permanently affixed to the tubes and seed particles and dirt typically accumulate in the bottom where it is difficult to clean.

It would be desirable, therefore, to have a plastic tubular bird feeder which is of simple construction, having fewer component parts and made of less expensive plastic materials. It would also be desirable to provide such a feeder in which the accumulation of seeds, seed particles and debris in the bottom is inhibited or which is easily accessible for cleaning.

SUMMARY OF THE INVENTION

In accordance with the present invention, a blow molded bird feeder is provided which is of substantially simpler and less expensive construction than comparable tubular bird feeders, yet provides a number of significant improvements and benefits.

The molded plastic bird feeder of the present invention includes a unitary molded enclosure having a hollow tubular body and integral opposite end caps. The molded enclosure is formed with cooperating attachment means which are adapted to be separated after the unitary enclosure is molded to separate one end cap from the body. The attachment means allow the separated end cap to be demountably rejoined to and removed from the body, as for filling the feeder. The unitary enclosure is most preferably formed by blow molding and the attachment means preferably comprises mating screw threads which are formed in one of the end caps and in the tubular body. The attachment means may also comprise an annular sleeve which forms part of the unitary molded enclosure and joins the mating screw threads prior to separation. Alternately, the attachment means may comprise interengaging tabs and grooves in the end cap and in the body which are adapted to provide a snap fit connection therebetween.

One of the end caps also preferably includes a through hole which is disposed on the longitudinal axis of the tubular body and provides an opening for receipt of a hanger device. In the blow molded construction, the through hole comprises the supply hole for the gas used in the blow molding process.

In another embodiment, the tubular body includes annular rib means which are formed adjacent one end, and a circular disc is inserted in the tube and supported by the rib means to, in turn, provide support for a column of seed in the tubular body above the disc. The rib means may comprise a single rib extending radially into the tubular body and adapted to support the disc thereon, or may comprise a pair of ribs extending radially into the tubular body, which ribs are spaced to define an annular groove therebetween in which the disc is inserted with a snap-fit.

In another aspect of the invention, cooperating attachment means are provided between both end caps and the tubular body, so that, upon separation, one or both of the end caps may be replaced with another tubular body to provide an extended length feeder. The tubular body may also be molded to include integral seed ports. In one form, each seed port comprises a groove which is defined by an upper surface and a lower surface joined at their radially inner edges, with the upper surface comprising a seed deflector hood and the lower surface defining a knock-out portion which provides a seed port opening.

The present invention also includes a method for making a bird feeder which comprises the steps of: molding a unitary plastic enclosure which has a hollow tubular body and a pair of end caps, said tubular body and one end cap including molded attachment means; separating the end cap from the unitary enclosure; and engaging said attachment means to demountably attach the separated end cap to the tubular body. The molding step preferably comprises blow molding.

In another embodiment of the invention, a modified molded enclosure including a hollow tubular body and single integral end cap is used to provide the basis for a feeder assembly which includes greater adaptability for the use of add on and/or replaceable parts. In this embodiment, the enclosure is formed with the hollow tubular body similar to the preceding embodiments and a single integral end cap on one end. Cooperating attachment means are formed on that end and are adapted to be separated after molding to separate the end cap from the body. The separated end cap may be demountably rejoined to and removed from the body, as in the prior embodiments, with the use of similar attachment means. Preferably, the attachment means comprises mating screw threads which are formed in the end cap and in the tubular body. Also as in the previously described embodiments, the attachment means includes an annular sleeve which forms part of the unitary molded enclosure and joins the mating screw threads prior to separation.

The end of the hollow tubular body opposite the end cap is formed with separate attachment means, preferably screw threads, to provide demountable connection for an independently formed end cap.

The upper end cap for the finally assembled bird feeder, whether formed as a part of an integral blow molded construction or independently formed by injection molding or other processes, may be formed with a small through hole on the longitudinal axis of the tubular body for attachment of a hanger device. The hanger preferably comprises a solid core flexible wire member which extends through the hole in the end cap and is secured within the cap by tying a knot or providing a bent end portion. A flexible washer is placed over the outer end of the wire support member in sealing engagement therewith and pushed down into engagement with the outside of the end cap.

In a further variation, one end of the tubular body is provided with separate screw thread patterns formed on the inside and on the outside of the end. A demountable seed tray for attachment to the end of the tubular body may include either of two screw thread attachment patterns. If two seed trays are used, both of the seed trays may include an integral central tubular sleeve, one embodiment of which is provided with an outer screw thread pattern which is attachable to the inside thread pattern on the end of the tubular body. The tubular sleeve of this embodiment includes an integral cap portion which closes one end of the tubular sleeve and thus one end of the tubular body of the feeder. The tubular sleeve portion of the other seed tray embodiment has an inner thread pattern that is connectable to the outside thread pattern on the end of the tubular body. The tubular sleeve portion has a completely open interior which permits independent access to the inside thread pattern on the end of the tubular body after the seed tray is mounted thereon. In this manner, other elements can be added to the feeder assembly, such as another tubular feeder body using for example the closed end feed tray described above, to provide an extended length feeder.

In a further embodiment, a molded plastic bird feeder assembly includes a hollow tubular body, an end cap, and a seed tray. Opposite first and second ends of the tubular body are provided with integrally molded connector means which include first interlocking connector means on the first end to provide either mating interlocking connection to the end cap or operative interlocking connection to a second end of another similarly molded tubular body, and second interlocking connector means on the opposite end of the tubular body for connection to either the seed tray or the first end of another similarly molded tubular body. The tubular body and end cap may be integrally blow molded, and the seed tray molded independently of the body and end cap. Alternately, the tubular body may be blow molded, and the end cap and seed tray molded independently. The interlocking connector means may comprise threaded connections or tab and groove connections.

BRIEF DESCRIPTION OF THE DRAWINGS

FIG. 1 is a perspective view of the bird feeder of the present invention.

FIG. 2 is a side elevation of the bird feeder shown in FIG. 1.

FIG. 3 is a side elevation of the bird feeder rotated 90° from the FIG. 2 view.

FIG. 4 is a top plane view of the bird feeder shown in FIGS. 2 and 3.

FIG. 13 is a side elevation of a feeder showing another embodiment of the invention.

FIGS. 14 and 15 are side elevations of separate end caps which may be used with the feeder of the embodiment shown in FIG. 13.

FIG. 16 is a partial side elevation of a tubular body for a feeder showing another embodiment of the threaded connections at the lower end.

FIG. 21 is a sectional detail similar to FIG. 7 showing an alternate means for connecting the end cap to the tubular body.

DETAILED DESCRIPTION OF THE PREFERRED EMBODIMENTS

Figure 5:
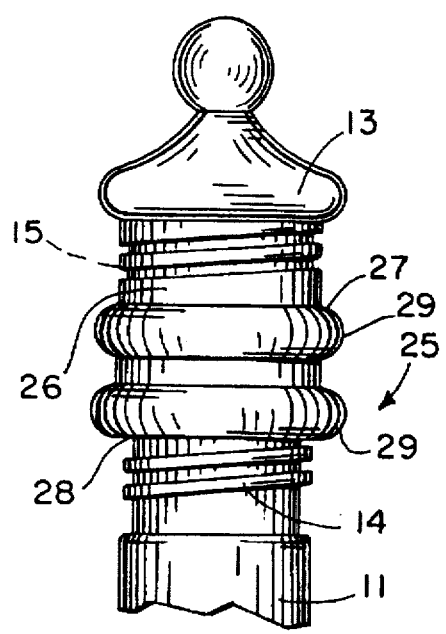
FIG. 5 is a side elevation of the upper end of the unitary enclosure from which the bird feeder is made prior to separating the end cap from the tubular body.

Referring first to FIGS. 1–4, the preferred embodiment of the bird feeder 10 of the present invention will be shown in its completed and assembled form. The feeder is preferably formed by a blow molding process, which will be described later. Any suitable UV stabilized plastic material may be used, such as a transparent PVC.

The feeder 10 includes a hollow tubular body 11, and integral lower end cap 12 and a removable upper end cap 13. The upper end cap 13 is preferably demountably attached to the tubular body 11 by mating screw threads comprising an outer screw thread pattern 14 on the upper end of the tubular body and an inner screw thread pattern 15 on the lower end of the upper end cap 13. The thread patterns 14 and 15 are formed in the molding process to be described below. The upper end cap 15 is also provided with an axial through hole 16 to accommodate attachment of a hanging device, such as a cord or wire 17.

The tubular body 11 includes a series of horizontally aligned hole pairs 18, each pair adapted to receive a small diameter tube or rod 20 which is long enough to extend outwardly of the tubular body to form a bird perch on either side of the body. A pair of seed holes 21 is formed vertically above each perch hole pair 18 and may be suitably sized to accommodate different types of bird seed. As shown in FIGS. 1-3, vertically adjacent perch rods 20 are offset by 90°, such that in the particular feeder shown, the upper and lower perch rods are parallel to one another and the intermediate perch rod is perpendicular thereto.

Figure 8:
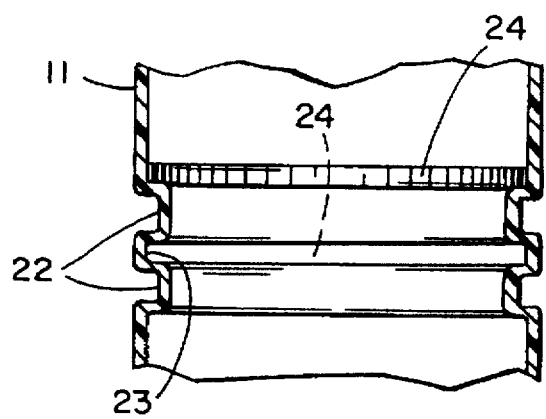
FIG. 8 is a partial sectional view showing the integrally molded ribs for supporting the closure disc for the lower end of the feeder.

Referring also to FIG. 8, the lower end of the tubular body 11, just above the lowermost hole pair 18 is provided with a pair of integrally molded annular ribs 22 formed to protrude radially inwardly. The ribs 22 are vertically spaced to define therebetween an annular groove 23. A small circular disc 24 of plastic or other suitable material is inserted into the open upper end of the tubular body 11 and allowed to drop and rest upon the upper annular rib 22, as best seen in FIGS. 1 and 8. The disc 24 supports the column of seed which fills the feeder and prevents seed, seed particles and dirt from entering the lower end of the tubular body and the hollow interior of the lower end cap 12 where it is wasted and accumulates and is difficult to clean out.

Alternately, the upper annular rib 22 may be formed of a somewhat different shape including, for example, downwardly inclined surface portions, whereby the disc 24 could be forced downwardly past the upper annular rib and to snap into the annular groove 23 above the lower rib. In this manner, the disc 24 would be held more securely in place. In lieu of the annular ribs 22, integrally molded, circumferentially spaced bosses could also be used to support the disc.

Figure 6:
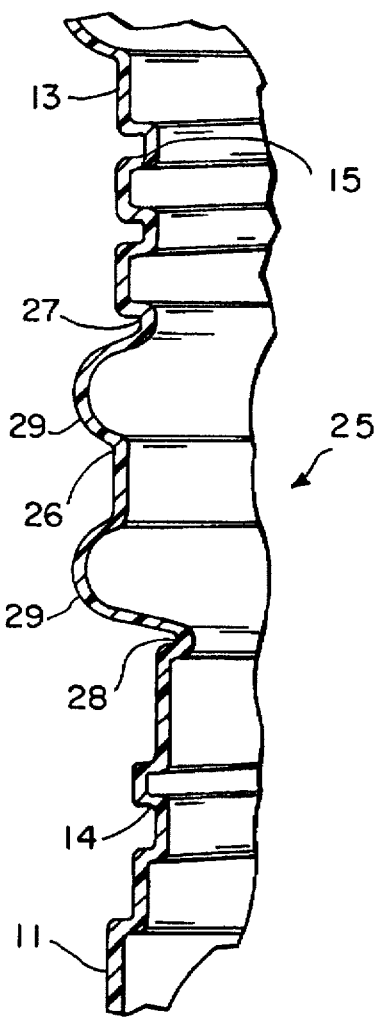
FIG. 6 is an enlarged partial sectional view of FIG. 5.
Figure 7:
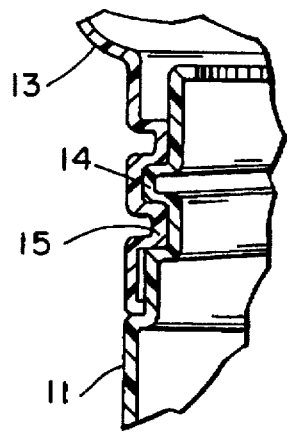
FIG. 7 is a partial sectional view after separation of the end cap and tubular body from the as-molded enclosure and after being attached together.

Referring also to FIGS. 5–7, the bird feeder 10 of the preferred embodiment is made from a unitary blow molded enclosure 25, the upper portion of which is shown in FIG. 5. The lower portion of the unitary enclosure 25 is as shown in the preceding drawings and includes the annular ribs 22 molded in the lower end of the tubular body and the integrally molded lower end cap 12. The as-molded enclosure 25 includes an annular sleeve 26 which separates the upper end cap 13 from the tubular body 11. The sleeve 26 is secured to the lower edge of the inner thread pattern 15 on the upper end cap along an annular seam 27. Similarly, the annular sleeve 26 is secured to the upper edge of the outer screw thread pattern 14 on the upper end of the tubular body by an integral annular seam 28, as best seen in FIG. 6. The body of the sleeve 26, between the upper and lower seams 27 and 28, is formed with a pair of large circular ribs 29, but the shape of the sleeve is not particularly important. The axial through hole 16 in the upper end cap 13 is formed in the blow molding process by the small tube through which gas is fed into the parison from which the enclosure is blow molded.

After the enclosure 25 has been formed, the sleeve 26 is cut away along both the upper seam 27 and the lower seam 28, leaving the separated upper end cap 13 which may be threaded onto the upper end of the tubular body 11 to close the bird feeder 10 as shown in FIG. 7.

Figure 11:
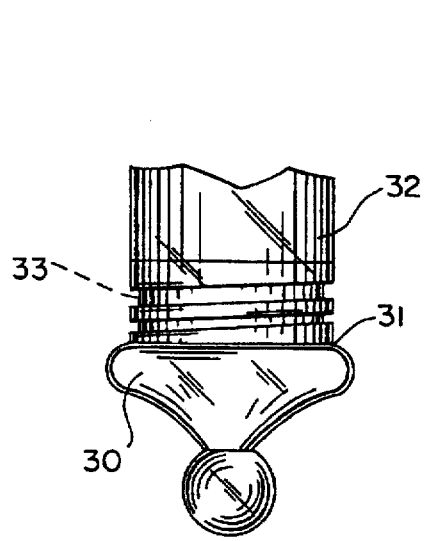
FIG. 11 is a side elevation view of the lower portion of a feeder showing an alternate embodiment of the end cap attachment means.
Figure 12:
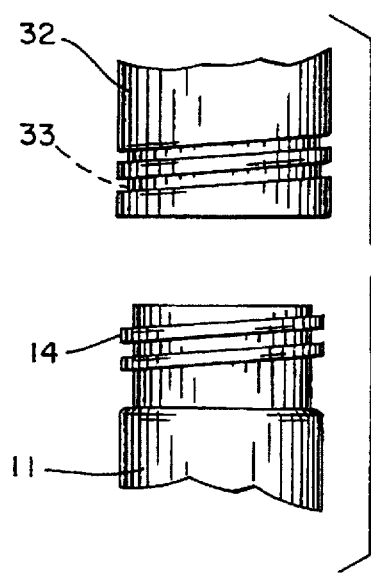
FIG. 12 is an exploded view showing the alternate attachment means of FIG. 11 used to interconnect two tubular bodies.

In an alternate embodiment, the unitary blow molded enclosure may be formed with a second annular sleeve (not shown) similar to the upper annular sleeve 26 to initially separate the lower end cap 12 from the lower end of the tubular body 11. Thus, as shown in FIGS. 11 and 12, a modified lower end cap 30 is formed with an integral outer thread pattern 31 and a modified tubular body 32 includes a molded inner thread pattern 33. When the annular sleeve is cut away (in the same manner as the upper annular sleeve 26 previously described), the modified lower end cap 30 may be threaded into the lower end of the modified tubular body 32, as shown in FIG. 11. In FIG. 12, the threaded upper end 14 of a previously described tubular body 11 or the threaded upper end of a modified tubular body 32 may also be threaded into the lower end of the modified tubular body 32 to provide an extended length bird feeder. If desired, of course, a slightly modified bird feeder could be made from the blow molded enclosure 25 of the preferred embodiment (FIG. 5) by inverting the same such that the removable end cap is the lower end cap 12 and the upper end cap 13 is formed to remain integral with the tubular body 11. The modified feeder would have to be inverted for filling, but would otherwise be made and assembled in the same manner previously described.

Instead of the threaded interconnections 14 and 15 or 31 and 33, the removable end cap 13 or 30 and adjacent end of the tubular body could be molded to include means for providing a snap fit connection therebetween. For example, as shown in FIG. 21 the cylindrical surface of the end cap 13 could be provided with a number of integral tabs 49 which project radially inwardly to cooperate with a mating series of grooves 59 formed in the upper end of the tubular body and also projecting radially inwardly. As the cap is pushed axially onto the upper end of the tubular body 11, the tabs would snap into the grooves 59 as a result of the inherent flexibility of the plastic material, which may have a thickness of, for example, 0.030 inch (0.76 mm).

Figure 9:
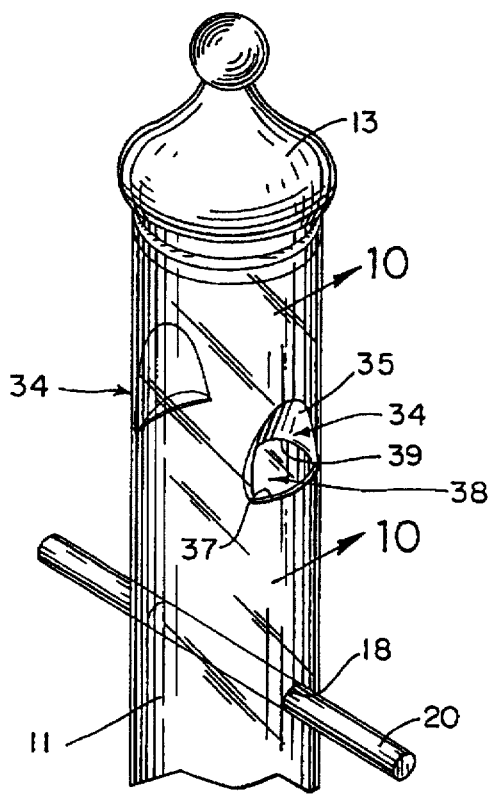
FIG. 9 is a perspective view of the upper end of feeder showing an alternate embodiment including integrally molded feed ports.
Figure 10:
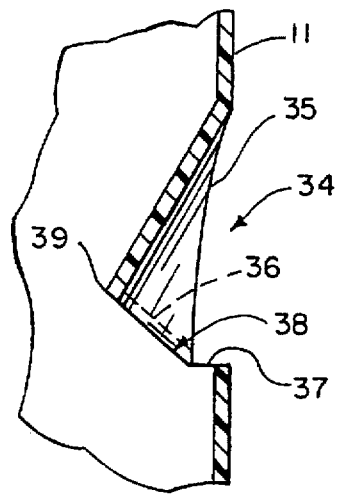
FIG. 10 is an enlarged partial sectional view taken along line 10—10 of FIG. 9.

A further embodiment of the invention is shown in FIGS. 9 and 10. The tubular body 11 may be formed in the blow molding process with indented portions or grooves 34. Each groove 34 is defined by a curved upper surface 35 and a flat lower surface 36 which are integrally joined at their radially inner edges along a curved edge 39. The lower surface 36 may be molded with a scored or otherwise weakened knock-out portion which, when removed after molding, provides a seed port opening 38. Alternately, as shown, the entire flat surface 36 may be cut out, along the curved inner edge 39 and a continuous circular edge 37. The downwardly inclined curved upper surface 35 provides a deflector hood so that seeds poured into the upper end of the tubular body or the descending column of seeds consumed by birds will not pass out of the seed port openings 38.

Although the various embodiments of the subject invention have been described to include a cylindrical tubular body 11, it should be understood that tubular bodies of any cross sectional shape may be utilized, including square, triangular, oblong and other shapes. All such shapes may be readily provided in the blow molded construction and using the blow molding method described. Similarly, the diameter of the tubular body 11, in any of various cross sectional shapes, may be made as large as desired.

The embodiment shown in FIG. 13 is similar to the FIG. 5 embodiment, except that the FIG. 13 bird feeder 50 is molded without an integral end cap on one end. More particularly, the feeder 50 includes a tubular body 51 which is integrally joined to a lower end cap 52 by an annular sleeve 26 which may be identical to that shown in FIGS. 5 and 6. Thus, the tubular body 51 includes an outer screw thread pattern 54 and the lower end cap 52 includes an inner screw thread pattern 55. After the feeder 50 is blow molded, the annular sleeve 26 is separated in two places to form a parting seam 27 along the end of the lower end cap and a parting lip 28 at the end of the tubular body. The lower end cap 52 may be threaded onto the lower end of the tubular body 51, as previously described with the embodiment of FIGS. 5–7. If desired, however, the bird feeder 50 may be used as molded without cutting away the annular sleeve 26.

The upper end of the tubular body 51 includes only an integral outer screw thread pattern 56 defining the upper opening in the tubular body and the point of attachment of a separately molded end cap, such as those to be described with respect to FIGS. 14 and 15. The open upper end of the tubular body also provides the opening for the gas used in the blow molding process.

Referring now to FIGS. 14 and 15, there are shown two differently shaped end caps 57 and 58, either of which may be utilized as the upper end cap for the bird feeder 50 of FIG. 13, instead for example of an integrally molded separable end cap 52. The smaller end cap 57 includes an inverted cup-shaped body 60 having an inner thread pattern 61 for permitting it to be screwed onto the outer screw thread pattern 56 on the upper end of the tubular body. The cap also includes an integral downwardly extending conical hood 62.

The larger end cap 58 of FIG. 15 also includes a cup-shaped body 63 which is somewhat deeper than the body 63 of the FIG. 14 cap. The body 63 includes an inner thread pattern 64, also adapted to mate with the screw thread pattern 56 at the top of the tubular body 51. A somewhat larger integral hood 65 is provided on the larger end cap and provides protection against rain and snow entering the seed ports. Both end caps 57 and 58 may be made of plastic by injection molding or could be made of metal or other material, if desired.

Each of the end caps 57 and 58 includes a central through hole 66, located similarly as the axial through hole 16 in the end cap 13 previously described, for the purpose of attaching a feeder hanger. The hanger preferably comprises a relatively rigid length of wire 67 which is knotted or otherwise bent at its lower end 68 to secure the hanger in place as the wire is inserted upwardly through the hole 66 in the end cap. By connecting the hanger in this way, the feed tube can be unscrewed from the cap without disturbing the attachment of the cap and hanger wire to the feeder support structure. On the outside, a flexible washer 70 is slipped onto the wire 67 and down into contact with the top of the end cap to provide a water tight seal. One preferable form of the wire hanger 67 is 18 gauge solid copper wire covered with a plastic coating. The washer 70 is preferably a neoprene washer. Braided or twisted cord materials may also be used as a hanger.

Figure 17:
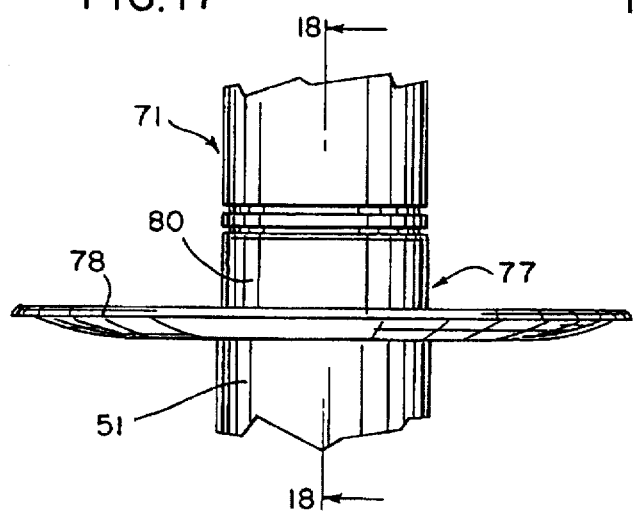
FIG. 17 is a view of the end portion of the FIG. 16 tubular body having threaded accessories attached thereto.
Figure 20:
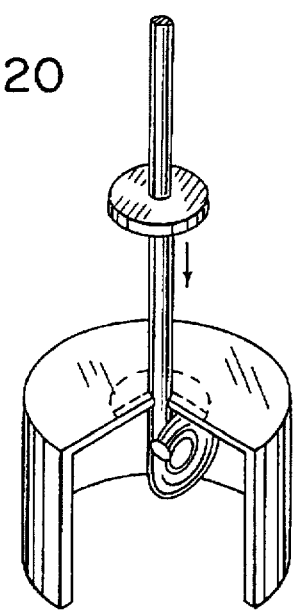
FIG. 20 is a perspective view of a feeder hanger usable with all of the disclosed upper end caps.

In FIGS. 16 and 17, there is shown another embodiment of a tubular body 71 which provides a much greater adaptability for the connection of accessory pieces to vary the size, capacity and functionality of the bird feeder in which it is used. The main portion of the body 71 may include conventional seed holes and opposite hole pairs for a perch rod, as previously described with respect to other embodiments. The upper end of the tubular body 71 is provided with an outer screw thread pattern which may be identical to the pattern 14 formed in the tubular body 11 of FIGS. 5–7 or the upper thread pattern 56 formed in the tubular body 51 of FIG. 13. Correspondingly, any of end caps 13, 57 or 58 may be utilized therewith to provide an upper closure for a bird feeder utilizing tubular body 71.

The lower end of the tubular body 71 is provided with an inside thread pattern 75 and an outside thread pattern 76. The outside thread pattern 76 may be similar to the outer screw thread pattern 54 in the tubular body 51 of FIG. 13 and formed in a similar manner. Thus, the outside thread pattern 76 may be adapted to accommodate an integrally formed and subsequently separated lower end cap 52 of the FIG. 13 embodiment or some other type of separately molded threaded end cap.

Figure 18:
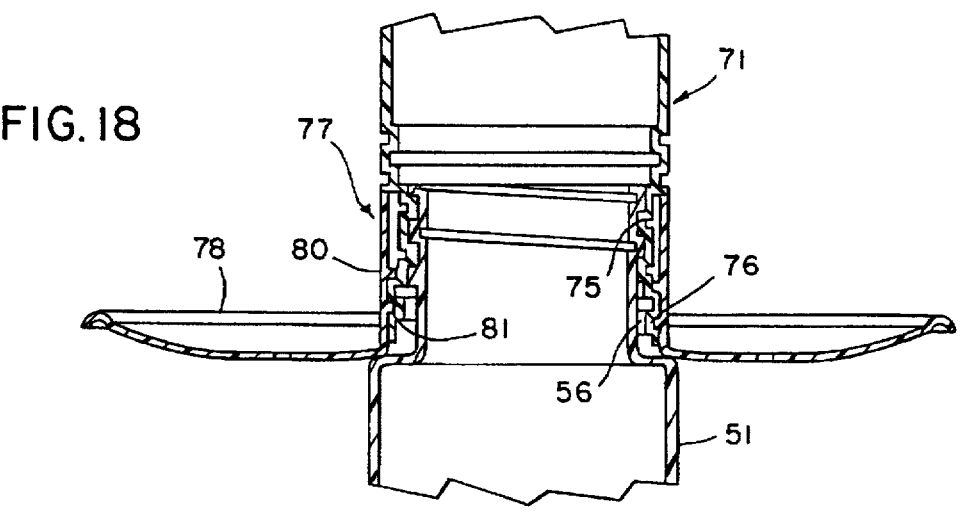
FIGS. 18 and 19 are side elevations of seed collecting trays which are alternately usable with the tubular body shown in FIG. 16 and one of which is also shown in FIG. 17.

Referring to FIG. 18, the outside thread pattern 76 may also be utilized to accommodate attachment of a seed tray 77. This seed tray is preferably made of an injection molded construction and includes a shallow lower tray portion 78 which surrounds a central upwardly extending tubular sleeve portion 80. The sleeve portion includes an inner thread pattern 81 allowing the tray 77 to be threaded onto the outside thread pattern 76 on the end of the tubular body 71. The interior of the tubular sleeve 81 is completely open to allow independent access to the inside thread pattern 75 after the seed tray 77 has been attached. The inside thread pattern 75 is designed to accommodate attachment of another tubular body, such as by means of the outer screw thread pattern 56 on the upper end of tubular body 51 in FIG. 13. In this manner, an extended length bird feeder may be provided, similarly to the embodiment described above and shown in FIG. 12.

Figure 19:
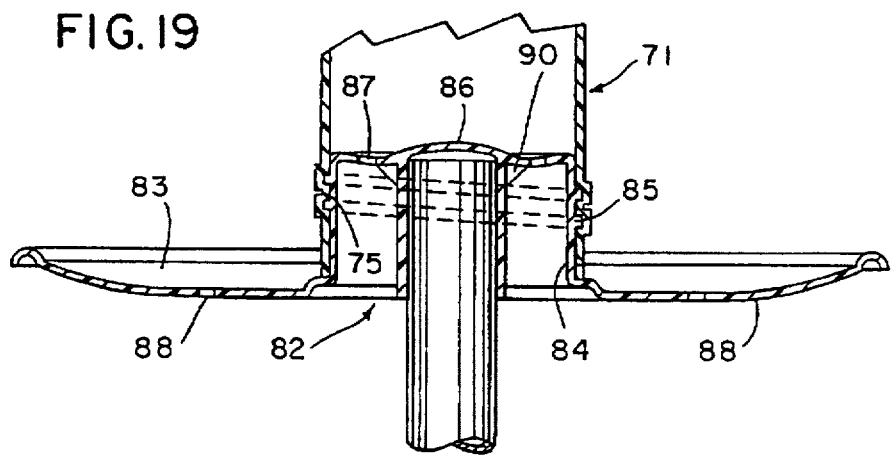

Alternately, the inside thread pattern 75 may 20 be utilized to accommodate a seed tray 82 shown in FIG. 19. Seed tray 82 also includes a lower tray portion 83 and an integral upstanding tubular sleeve 84. The tubular sleeve is provided with an outside thread pattern 85 adapted to cooperate with and provide connection to the inside thread pattern 75 in the tubular body 71. The top of the tubular sleeve 84 includes an integral closure face 86 to enclose the bottom of the tubular body and retain the seeds therein. The closure face 86 may include a series of moisture relief holes 87 to help dispel any moisture which may accumulate in the tubular body. The tray portion 83 includes a series of drain holes 88 to drain rain water which might otherwise accumulate in the tray. Similar drain holes are provided in the seed tray 77 of FIG. 18.

An integral post sleeve 89 may be located coaxially within the tubular sleeve 84 and depend downwardly from its connection with the closure face 86. The bottom of the post sleeve 89 is open to allow the tray and the attached feeder assembly to be mounted on a suitable supporting post. Preferably, a series of circumferentially spaced reinforcing ribs 90 connects the upper end of the post sleeve 89 to the underside of the closure face 86.

I claim:

1. A molded plastic bird feeder comprising:
   a unitary molded enclosure including a hollow tubular body and an integral end cap;
   cooperating attachment means formed with the molded enclosure and adapted to be separated after molding to separate the end cap from the body; and,
   said attachment means adapted to be demountably joined after separation to allow the end cap to be attached to and removed from the body.

2. The bird feeder as set forth in claim 1 wherein said attachment means comprises mating screw threads formed in said end cap and in said body.

3. The bird feeder as set forth in claim 2 wherein said attachment means comprises an annular sleeve forming part of said unitary molded enclosure and joining said mating screw threads prior to separation.

4. The bird feeder as set forth in claim 2 including separate screw thread patterns formed on the inside and on the outside of one end of said tubular body.

5. The bird feeder as set forth in claim 4 including a demountable seed tray attachable to said one end of the tubular body, said seed tray having an integral central tubular sleeve portion provided with a screw thread pattern selected from the group comprising an outer thread pattern connectable to the inside thread pattern on said tubular body and an inner thread pattern connectable to the outside thread pattern of said tubular body.

6. The bird feeder as set forth in claim 5 wherein the tubular sleeve portion having the outer thread pattern includes an integral cap portion closing one end of said sleeve portion.

7. The bird feeder as set forth in claim 5 wherein the tubular sleeve portion having the inner thread pattern includes an open interior allowing independent access to the inside thread pattern on the tubular body after mounting the seed tray thereon.

8. The bird feeder as set forth in claim 1 wherein the end of said hollow tubular body opposite said end cap is formed with separate attachment means adapted to demountably connect with an independently formed end cap.

9. The bird feeder as set forth in claim 8 wherein said separate attachment means comprises mating screw threads in said tubular body and in said independently formed end cap.

10. The bird feeder as set forth in claim 8 including a hanger device attachable to an end cap to support the feeder, and wherein one of said end caps includes a through hole disposed on the longitudinal axis of the tubular body for receipt of said hanger device, whereby the feed tube may be demounted without demounting the cap and hanger device.

11. The bird feeder as set forth in claim 10 wherein the hanger device comprises an elongate vertical support of circular cross section and a diameter approximately equal to the diameter of the through hole in the end cap.

12. The bird feeder as set forth in claim 11 wherein said vertical support comprises:

a solid core flexible wire member extending through the hole in the end cap and secured within said cap by an end portion bent to form an offset from the axis of the wire member; and, a flexible washer sealingly surrounding the wire member in close proximity with the outside of the end cap.

13. A molded plastic bird feeder assembly including a hollow tubular body, an end cap, and a seed tray and further comprising:

integrally molded connector means on opposite first and second ends of said tubular body, including first interlocking connector means on the first end for one of mating interlocking connection to said end cap and operative interlocking connection to a second end of another similarly molded tubular body, and second interlocking connector means on the opposite second end of said tubular body for connection to one of said seed tray and said first end of another similarly molded tubular body;

said first connector means including an externally threaded upper end on said tubular body, and said second connector means including means for attaching said seed tray to the lower end of said tubular body and for operatively connecting said lower end to the threaded upper end of said other similarly molded tubular body.

14. The assembly as set forth in claim 13 wherein said tubular body and said end cap are integrally blow molded.

15. The assembly as set forth in claim 14 wherein said seed tray is molded independently of said tubular body and end cap.

16. The assembly as set forth in claim 13 wherein said tubular body is blow molded.

17. The assembly as set forth in claim 16 wherein said end cap and said seed tray are molded independently.

18. The assembly as set forth in claim 13 wherein said end cap includes an integral internally threaded cylindrical body adapted to receive said externally threaded upper end of said tubular body.

19. The assembly as set forth in claim 13 wherein said seed tray includes an internally threaded cylindrical sleeve, and said second connector means comprises an internally and externally threaded lower end on said tubular body, said seed tray sleeve adapted to be threadably attached to said externally threaded lower end, and the threaded upper end of said other molded tubular body adapted to extend through said cylindrical sleeve and to be threadably attached to said internally threaded lower end.

20. A molded plastic bird feeder assembly comprising:

a pair of hollow tubular bodies;

an end cap for closing an upper end of one of said tubular bodies;

a seed tray for attachment to a lower end of one of said tubular bodies; and, each of said tubular bodies having a threaded upper end operatively connectable to one of said end cap and the lower end of the other tubular body.

* * * * *